United States Patent
Mahfoudh

(10) Patent No.: US 9,994,161 B2
(45) Date of Patent: Jun. 12, 2018

(54) HOLDER FOR FASTENING A UNIT, IN PARTICULAR A PUMP, TO A MOTOR VEHICLE

(71) Applicant: Robert Bosch GmbH, Stuttgart (DE)

(72) Inventor: Samir Mahfoudh, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 15/165,229

(22) Filed: May 26, 2016

(65) Prior Publication Data
US 2017/0217380 A1    Aug. 3, 2017

(30) Foreign Application Priority Data
Feb. 2, 2016  (DE) .................. 10 2016 201 560

(51) Int. Cl.
| | |
|---|---|
| *F16M 1/00* | (2006.01) |
| *B60R 11/00* | (2006.01) |
| *H02K 5/16* | (2006.01) |
| *H02K 5/24* | (2006.01) |
| *F16F 1/371* | (2006.01) |

(52) U.S. Cl.
CPC .............. *B60R 11/00* (2013.01); *F16F 1/371* (2013.01); *F16M 1/00* (2013.01); *H02K 5/16* (2013.01); *H02K 5/24* (2013.01); *B60R 2011/0052* (2013.01)

(58) Field of Classification Search
CPC .......... F16M 13/00; F16M 1/00; F16M 1/021; F16M 1/08; F16M 1/025; F16M 1/026; H02K 5/24; H02K 5/16; H02K 5/04; H02K 5/225; F16F 15/04; F16F 1/371; F16F 1/3732; B60R 11/00; B60R 2011/0052

USPC ....... 248/674, 300, 903, 603, 604, 659, 675, 248/634; 417/360, 313, 423.15, 361
See application file for complete search history.

(56) References Cited

U.S. PATENT DOCUMENTS

| | | | | |
|---|---|---|---|---|
| 3,012,743 A | * | 12/1961 | Jenkins | H02K 5/24 248/606 |
| 5,113,104 A | * | 5/1992 | Blaettner | F16C 23/04 310/154.07 |
| 5,397,950 A | * | 3/1995 | Norbury, Jr. | H02K 1/187 310/51 |
| 5,696,360 A | * | 12/1997 | Tiemeyer | H02K 5/24 181/202 |

(Continued)

FOREIGN PATENT DOCUMENTS

| | | |
|---|---|---|
| DE | 2526061 A1 | 12/1975 |
| DE | 2933586 A1 | 2/1981 |

(Continued)

*Primary Examiner* — Nkeisha Smith
(74) *Attorney, Agent, or Firm* — Michael Best & Friedrich LLP

(57) ABSTRACT

A holder for fastening a unit, in particular a pump, to a motor vehicle, with a damping element and a fastening element which is connected to the damping element, wherein the damping element is connectable to the unit, wherein the fastening element comprises at least one limb and a connecting portion connected to the limb, wherein the limb is designed to stiffen the damping element at least in sections, wherein the connecting portion is connectable to the motor vehicle, wherein a thickness of the limb decreases with increasing distance from the connecting portion.

28 Claims, 4 Drawing Sheets

(56) References Cited

U.S. PATENT DOCUMENTS

| | | | | |
|---|---|---|---|---|
| 8,714,943 B2* | 5/2014 | Bahmata | ............... | F01C 21/007 |
| | | | | 403/365 |
| 9,035,506 B2* | 5/2015 | Miyaji | ................... | H02K 13/00 |
| | | | | 310/68 R |
| 9,057,414 B2* | 6/2015 | Kim | .......................... | F16F 1/38 |
| 9,441,705 B2* | 9/2016 | Hein | ....................... | F16F 1/371 |
| 2005/0023912 A1* | 2/2005 | Lin | ........................ | H02K 1/185 |
| | | | | 310/89 |
| 2007/0035073 A1* | 2/2007 | Kinmartin | ............... | F16F 1/373 |
| | | | | 267/136 |
| 2009/0184596 A1* | 7/2009 | Masato | .................... | B06B 1/16 |
| | | | | 310/91 |
| 2014/0299735 A1* | 10/2014 | Hein | ....................... | F16F 1/371 |
| | | | | 248/562 |

FOREIGN PATENT DOCUMENTS

| | | | |
|---|---|---|---|
| DE | 3931221 | A1 | 4/1990 |
| DE | 19713461 | A1 | 11/1997 |
| DE | 102011085558 | | 5/2013 |
| JP | S62274123 | A | 11/1987 |

* cited by examiner

HOLDER FOR FASTENING A UNIT, IN PARTICULAR A PUMP, TO A MOTOR VEHICLE

BACKGROUND OF THE INVENTION

The invention relates to a holder.

DE 10 2011 085 558 A1 discloses a holder for fastening a unit, in particular a pump, to a motor vehicle, with an annular damping element, the inner region of which is provided for receiving the unit and which has a fastening element on the outer side, upper side pointing away from the center of the damping element is provided as an intersection of the motor vehicle. A substantially plate-like insert element made of metal is arranged in the damping element and is configured for the local reinforcement of the damping element. The insert part is formed on two opposite edges with a respective wing running into the damping element. The wings have a constant thickness over their length. This results in different loading of the insert part, and therefore there is the risk of a mechanical breakage at the transition of the wings to the plate-like insert part.

SUMMARY OF THE INVENTION

It is an object of the invention to provide an improved holder which is stable in the long term.

It has been recognized that an improved holder for a unit, in particular a pump, on a motor vehicle can be provided by the holder comprising a damping element and a fastening element which is connected to the damping element, wherein the damping element is connectable to the unit, wherein the fastening element comprises at least one limb and a connecting portion connected to the limb, wherein the limb is designed to stiffen the damping element at least in sections, wherein the connecting portion is connectable to the motor vehicle, wherein a thickness of the limb decreases with increasing distance from the connecting portion.

This refinement has the advantage that cutting of the fastening element into a material of the damping element and possible damage of the damping element by the fastening element are avoided.

In a further embodiment, the thickness of the limb is selected at least in sections in such a manner that, when a force is introduced into the limb, a bending stress is constant over at least a portion of the limb. This refinement ensures that, when the fastening element is loaded, in particular during installation of the unit on the holder, local overloading of the limb, which may possibly result in breakage of the limb, is avoided. As a result, the holder is particularly stable over the long term and can reliably fix the unit on the motor vehicle.

In a further embodiment, the fastening element has a further limb, wherein the further limb is connected to the connecting portion, wherein the connecting portion is arranged between the limb and the further limb. A thickness of the further limb decreases with increasing distance of the further limb from the connecting portion. The damping element can thereby be stiffened on both sides by the two limbs, and sagging of the damping element when supporting the unit can be reliably avoided. Furthermore, high moments on the connecting portion are avoided by the limbs being simultaneously arranged on the connecting portion.

In a further embodiment, the connecting portion, the limb and the further limb are formed integrally and of the same material. The fastening element preferably has a plastic, in particular a polyamide, as the material. Alternatively or additionally, the damping element has a further material, wherein the further material preferably has an elastomer. Alternatively or additionally, the material of the fastening element has a lower elasticity than the further material of the damping element. Additionally or alternatively, the holder is produced by means of an injection-molding process, in particular a two-component injection-molding process.

In a further embodiment, the damping element is designed extending annularly about a longitudinal axis. The limb has a first portion. The first portion runs on a circular path about the longitudinal axis.

In a further embodiment, the limb comprises a second portion, wherein the second portion is of substantially flat design. The second portion is connected to the first portion and to the connecting portion and is arranged between the first portion and the connecting portion.

In a further embodiment, the limb comprises a recess. The recess is preferably of trapezoidal design. The recess has an increasing cross section in the direction of a free end of the limb. As a result, it can be additionally ensured that the bending moment in the limb is constant beyond the limb towards the free end. Furthermore, a reliable form-fitting connection of the damping element and of the fastening element is reliably ensured.

In a further embodiment, the damping element has a receptacle with a receiving portion. The receiving portion is designed in a manner corresponding to the limb, wherein the receiving portion completely engages around the limb. As a result, secure fastening, in particular a form-fitting and/or integrally bonded connection between the damping element and the limb can be reliably ensured.

In a further embodiment, the connecting portion is of flat design. The limb is connected on a first side surface to the connecting portion. The fastening element comprises a stiffening rib on the first side surface. The stiffening rib is connected to the connecting portion and preferably extends over at least 80 percent of a maximum longitudinal extent of the connecting portion. This ensures that a distortion of the connecting portion, in particular during the curing of the connecting portion after the injection molding, is avoided. As a result, it is ensured that the connecting portion is flat.

In a further embodiment, the stiffening rib is connected to the second portion of the limb. As a result, a particularly low consumption of material for producing the fastening element with the stiffening rib is ensured. Additionally or alternatively, the stiffening rib is arranged in the transverse direction between the limb and the further limb. The holder can thereby be of particularly compact design.

In a further embodiment, the fastening element comprises at least one fastening bolt. The fastening bolt is connected to the connecting portion. The damping element has a first contact surface and a second contact surface arranged at a distance from the first contact surface. The fastening bolt is arranged between the first contact surface and the second contact surface. This ensures a reliable, uniform loading of the contact surface.

In a further embodiment, the holder has an engagement element. The fastening bolt has a groove. The fastening bolt is designed to reach through a fastening portion of the motor vehicle. The engagement element is arranged on a side of the fastening portion that faces away from the damping element, and engages in a groove in order to secure the fastening bolt on the fastening portion. A distance between the groove and the contact surface is smaller than a thickness of the fastening portion. This ensures that the holder is connected to the fastening portion of the motor vehicle in a force-fitting manner.

In a further embodiment, the fastening element has at least one broken edge. The broken edge is preferably rounded or beveled. This ensures that the fastening element does not cut into the further material of the damping element and therefore the damping element prematurely tears.

BRIEF DESCRIPTION OF THE DRAWINGS

The invention is explained in more detail below with reference to figures, in which.

DETAILED DESCRIPTION

Figure 1:
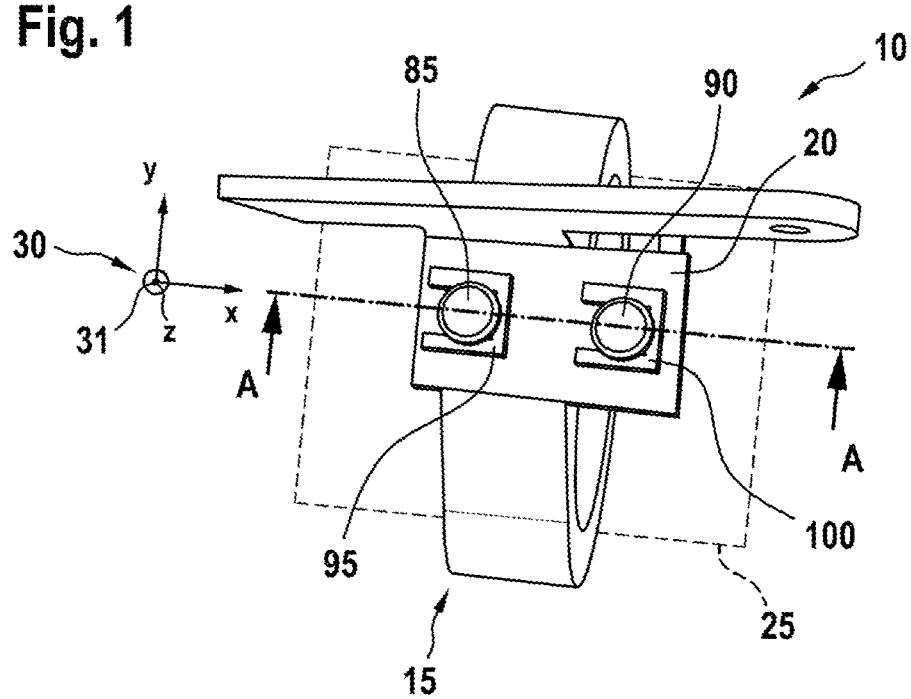
FIG. 1 shows a perspective view of a system.

FIG. 1 shows a perspective illustration of a system 10. Reference will be made in the following figures to a system of coordinates 30. The system of coordinates 30 is designed as a right-handed system. The system of coordinates 30 has an x axis (longitudinal direction), a Y axis (transverse direction) and a z axis (height). The x axis, the Y axis and the z axis intersect at an origin 31. Of course, the system of coordinates 30 may also be designed differently. The system of coordinates 30 serves below to explain the configuration of the system 10 in the following figures particularly clearly.

The system 10 comprises a holder 15, a fastening portion 20 and a unit 25. The fastening portion 20 may be, for example, part of a motor vehicle, in particular of an internal combustion engine or of a body. The unit 25 may be designed, for example, as a pump. The unit 25 is, by way of example, of cylindrical design in sections and is connected to the fastening portion 20 by means of the holder 15.

Figure 2:
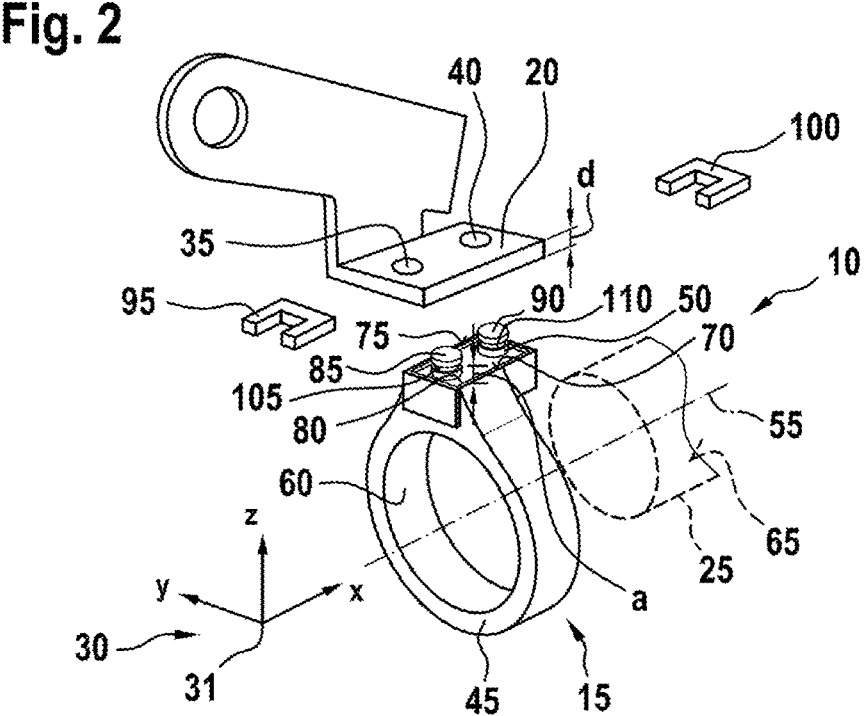
FIG. 2 shows an exploded illustration of the system shown in FIG. 1.

FIG. 2 shows an exploded illustration of the system 10 shown in FIG. 1.

The fastening portion 20 is of flat design, by way of example. The fastening portion 20 extends, for example, in an xy plane and has by way of example a first through opening 35 and a second through opening 40. The first through opening 35 is arranged at a distance from the second through opening 40 in the longitudinal direction.

The holder 15 comprises a damping element 45 and a fastening element 50. The damping element 45 runs annularly in sections about a longitudinal axis 55 which is preferably oriented parallel to the x axis, by way of example is arranged on the x axis in the embodiment. The damping element 45 here has a first receptacle 60. The first receptacle 60 is of cylindrical design and serves to engage around an outer circumferential surface 65 of the unit 25.

The damping element 45 furthermore has a first contact surface 70 and preferably a second contact surface 75. The first contact surface 70 and the second contact surface 75 are arranged on a side of the damping element 45 that faces the fastening portion 20, and, by way of example, are arranged at a distance from one another in the transverse direction. The damping element 45 bears with the first and the second contact surface 70, 75 against the fastening portion 20. The fastening portion 20 has a fastening portion thickness d in the z direction.

Between the first contact surface 70 and the second contact surface 75, the damping element 45 has a depression 80. The depression 80 is arranged offset in the z direction in relation to the first and/or second contact surface 70, 75 on a side facing away from the fastening portion 20. The depression 80 is of groove-shape design, by way of example.

By way of example, the fastening element 50 has a first fastening bolt 85 and a second fastening bolt 90. The first fastening bolt 85 is assigned to the first through opening 35. The second fastening bolt 90 is assigned to the second through opening 40. The fastening bolt 85, 90 in each case has a groove 105, 110. In the non-mounted state of the system 10, the groove 105, 110 is at a groove distance a from the contact surface 70, 75 in the z direction.

The holder 15 furthermore comprises a first engagement element 95 and, by way of example, a second engagement element 100. In the embodiment, the first engagement element 95 and the second engagement element 100 are of identical design, by way of example. The engagement element 95, 100 is, by way of example, of U-shaped design. The engagement element 95, 100 preferably has metal as the material.

Figure 3:
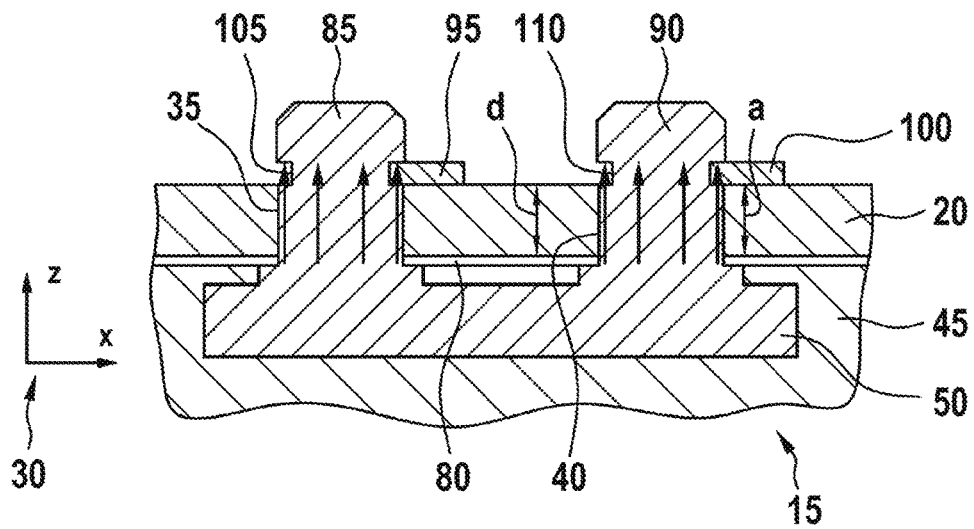
FIG. 3 shows a sectional view along a section plane A-A, which is shown in FIG. 1, through the system shown in FIG. 1.

FIG. 3 shows a cross section along a section plane A-A, which is shown in FIG. 1, through the system 10. The engagement element 95, 100 is arranged on a side of the fastening portion 20 that faces away from the damping element 45. The first fastening bolt 85 is guided through the first through opening 35 and the second fastening bolt 90 is guided through the second through opening 40. The first engagement element 95 engages in the first groove 105 and connects the first fastening bolt 85 to the fastening portion 20 in a form-fitting manner. The second engagement element 100 engages in the second groove 110 on a side of the fastening portion 20 that faces away from the damping element 45, and connects the second fastening bolt 90 to the fastening portion 20 in a form-fitting manner.

By means of the U-shaped configuration of the engagement element 95, 100, the engagement element 95, 100 can be pushed in a simple manner in the longitudinal direction into the groove 105, 110 such that the holder 15 can be connected to the fastening portion 20 particularly rapidly and cost-effectively.

It is particularly of advantage if, in the unmounted state of the holder 15, the groove distance a is smaller than the fastening portion thickness d of the fastening portion 20. In order to mount the engagement element 95, 100, the damping element 45 is compressed and prestressed against the contact surface 70, 75. The engagement element 95, 100 is then pushed into the groove 105, 110. The prestress is at least partially maintained in the mounted state by the choice of the groove distance a being smaller than the fastening portion thickness d, and therefore the holder 15 is additionally connected to the fastening portion 20 in a force-fitting manner. As a result, compensation for tolerances can be provided between holder 15 and fastening portion 20. Furthermore, the engagement element 95, 100 is loaded in the z direction in the groove 105, 110, and therefore an unintentional release of the engagement element 95, 100 from the groove 105, 110 is prevented.

Figure 4:
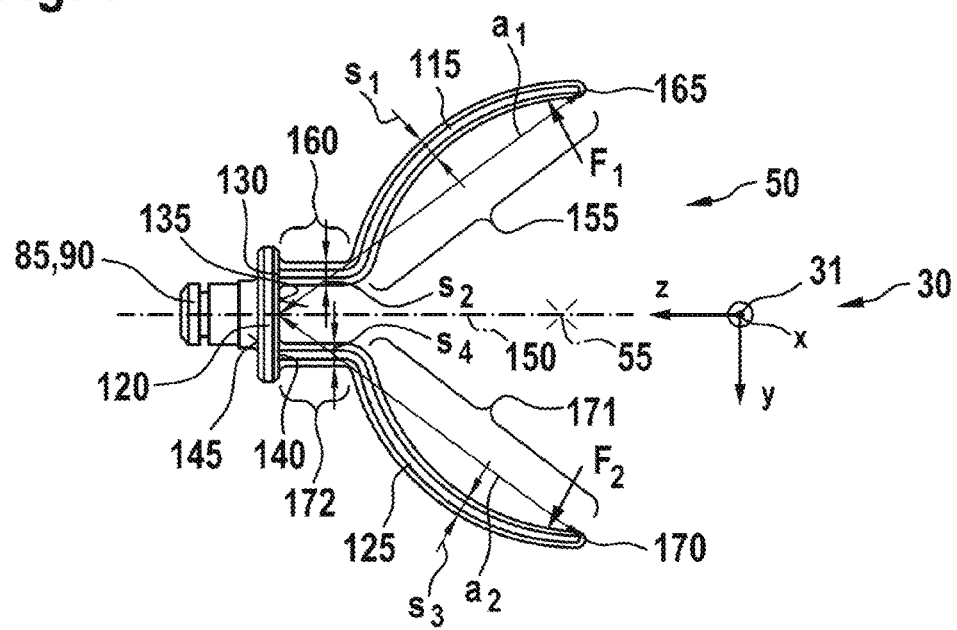
FIG. 4 shows a side view of a fastening element of the holder.

FIG. 4 shows a side view of the fastening element 50. The fastening element 50 comprises a first limb 115, a connecting portion 120 and a second limb 125. The first limb 115 is connected at its fixed end 130 to a first side surface 135 of the connecting portion 120. The second limb 125 is likewise connected at its fixed end 140 to the first side surface 135 of the connecting portion 120. The fixed end 130 of the first limb 115 is arranged offset in the transverse direction (y axis) with respect to the fixed end 140 of the second limb 125. The limbs 115, 125 are arranged at the same height in the longitudinal direction. On a second side surface 145 lying opposite the first side surface 135, the fastening bolt 85, 90 is connected to the connecting portion 120. The connecting portion 120 is of flat design and extends by way of example in an xy plane.

In the embodiment, the first limb 115 and the second limb 125 are, by way of example, of axially symmetrical design with respect to a plane of symmetry 150. The plane of symmetry 150 runs here in an xy plane. Of course, the first limb 115 may also be designed differently from the second limb 12.

The first limb 115 has a first portion 155 and a second portion 160. The second portion 160 is adjacent here to the fixed end 130 of the first limb 115. The second portion 160 is arranged here between the first portion 155 and the connecting portion 120. The second portion 160 is of flat design and extends by way of example in an xz plane. The first portion 155 runs by way of example on a circular path about the longitudinal axis 55. Other geometrical configurations of the first portion 155 are also conceivable. In the embodiment, the first portion 155 encloses, by way of example, approximately a segment of a quarter circle, and therefore a free end 165 of the first limb 115 ends approximately level with the longitudinal axis 55. In the first portion 155, a first thickness $s_1$ of the first limb 115 decreases at an increasing first distance al from the connecting portion 120 towards the free end 165 of the first limb 115. The first thickness $s_1$ is selected in the first portion 155 in such a manner that, when a first force $F_1$, which at least partially acts in a yz plane, acts on the first limb 115, for example when the unit 25 is installed on the holder 15, a first bending stress $S_1$ is substantially constant over the extent of the first portion 155.

In the second portion 160, a second thickness $s_2$ of the first portion 160 is, for example, constant. The second thickness $s_2$ of the first limb 115 can also decrease in the second portion 160 with an increasing first distance $a_i$ from the connecting portion 120 toward the first portion 155 of the first limb 115. As a result, the first bending stress $S_1$ can also be kept constant in the second portion 160 in the event of a loading.

The second limb 125 has a third portion 171 and a fourth portion 172. The fourth portion 160 is adjacent here to the fixed end 140 of the second limb 125. The fourth portion 172 is arranged here between the third portion 171 and the connecting portion 120. The fourth portion 172 is of flat design and extends in the transverse direction offset parallel to the second portion 160. The third portion 171 runs, by way of example, on a circular path about the longitudinal axis 55. Other geometrical configurations of the third portion 171 are also conceivable. In the embodiment, the third portion 171 encloses, by way of example, approximately a segment of a quarter circle, wherein a free end 170 of the second limb 125 ends approximately level with the longitudinal axis 55. As a result, the limbs 115, 125 together engage around approximately an angular segment of 180°. The second and fourth portions 160, 172 are designed to be of the same width in the z direction.

In the third portion 171, a third thickness $s_3$ of the second portion 125 decreases with an increasing second distance $a_2$ from the connecting portion 120 toward the free end 170 of the second limb 125. The third thickness $s_1$ is selected in the third portion 171 in such a manner that, when a second force $F_2$, which at least partially acts in a yz plane, acts on the second limb 125, for example when the unit 25 is installed on the holder 15, a second bending stress $S_2$ is substantially constant over the extent of the third portion 171.

In the fourth portion 172, a fourth thickness $s_4$ of the fourth portion 172 is, for example, constant. The fourth thickness $s_4$ of the second limb 125 can also decrease in the fourth portion 172 with an increasing second distance $a_2$ from the connecting portion 120 toward the third portion 171 of the second limb 125.

The above-described configuration of the limb 115, 125 has the advantage that an expansion of the limb 115, 125 resulting from the force $F_1$, $F_2$ and therefore a resulting mechanical stress of the fastening element 50 are distributed over the entire limb 115, 125 and do not act locally on the limb 115, 125. The entire structure of the fastening element 50 therefore acts in a supporting manner, and a predetermined breaking point is avoided on the fastening element 50.

This has the advantage that the unit 25 is reliably fastened to the fastening portion 20, and a deflection of the unit 25, for example during installation, for example in particular installation of tubes, in particular, for example, cooling tubes, or during the operation of the unit 25, is greatly limited.

Figure 5:
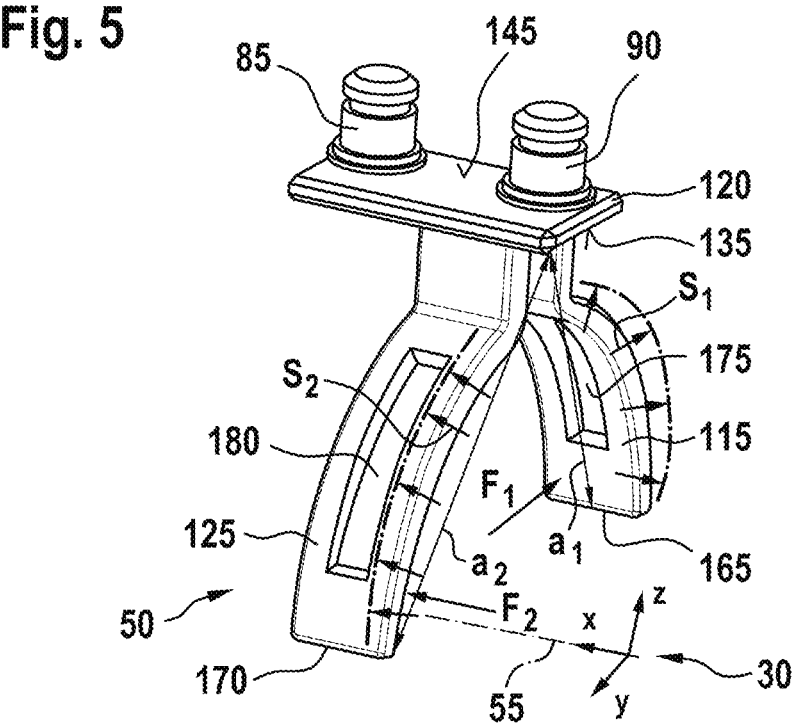
FIG. 5 shows a perspective view of the fastening element shown in FIG. 4.

FIG. 5 shows a perspective view of the fastening element 50 shown in FIG. 4. The first limb 115 has a first recess 175 and the second limb 125 has a second recess 180. The recess 175, 180 is, by way of example, of trapezoidal design and, by way of example, is designed as a through opening in the limb 115, 125. It would also be conceivable for the recess to be designed as an indentation in the limb 115, 125 and/or for only one of the two limbs 115, 125 to have the recess 175, 180. The recess 175, 180 may also be omitted. The recess 175, 180 has an increasing cross section in the direction of the free end 165, 170 of the limb 115, 125. The recess 175, 180 may also be of geometrically different design. In the embodiment, the first recess 175 and the first portion 155 of the first limb 115 are coordinated with each other in such a manner that, when the first force $F_1$ is introduced into the first portion 155, the first bending stress $S_1$ is constant over the extent of the first portion 155. In a similarly advantageous manner, the second recess 180 and the third portion 171 of the second limb 125 are coordinated with each other in such a manner that, when the second force $F_2$ is introduced into the third portion 171, the second bending stress $S_2$ is constant over the extent of the third portion 171.

In the embodiment, the connecting portion 120, the first limb 115, the second limb 125 and the fastening bolt 85, 90 are formed integrally and of the same material. It is particularly of advantage in this connection if the fastening element 50 has a plastic, in particular a polyamide, as the material. Furthermore, it is of advantage if the fastening element 50 is produced by means of an injection-molding process.

Furthermore, in the embodiment, at least one edge 173 of the fastening element 50, preferably all of the edges 173, is or are broken. The broken edge 173 may be rounded or beveled here. This configuration has the advantage that the fastening element 50 can be particularly easily released from an injection mold.

Figure 6:
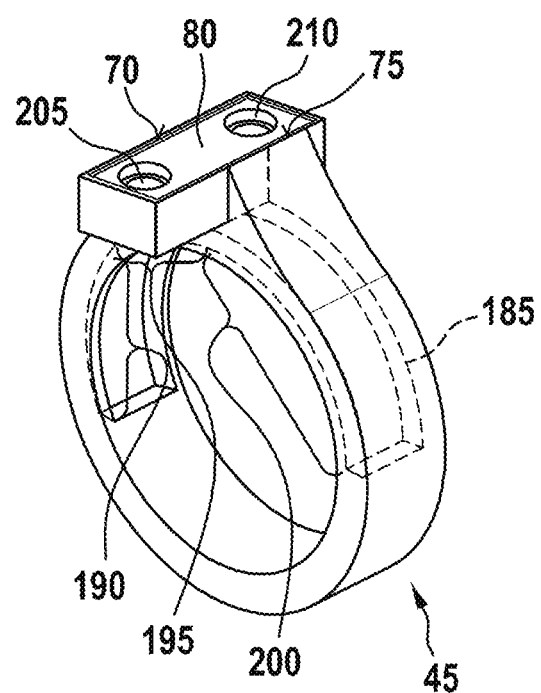
FIG. 6 shows a perspective illustration of a damping element of the system shown in FIGS. 1 and 2.

FIG. 6 shows a perspective illustration of the damping element 45. The damping element 45 is of substantially annular design and has a second receptacle 185. The second receptacle 185 has a first receiving portion 190, a second receiving portion 195 and a third receiving portion 200.

Furthermore, the second receptacle 185 comprises a first outlet opening 205 and a second outlet opening 210. The first outlet opening 205 and the second outlet opening 210 are arranged adjacent to the depression 80 between the two contact surfaces 70, 75. The outlet opening 205, 210 is connected to the second receiving portion 195.

The first limb 115 engages in the first receiving portion 190. The first limb 115 in the first receiving portion 190 is completely engaged around here by the first receiving portion 190, and therefore the first limb 115 is completely covered by a further material of the damping element 45. The connecting portion 120 engages in the second receiving portion 195. In the embodiment, the second receiving portion 195 completely engages around the connecting portion 120. The first fastening bolt 85 is guided through the first outlet opening 205 and the second fastening bolt 90 is guided through the second outlet opening 210. The second limb 125 engages in the third receiving portion 200, wherein the third receiving portion 200 completely engages around the second limb 125, and therefore the second limb 125 is completely surrounded by the further material of the damping element 45.

It is of particular advantage here if an elastomer preferably has in particular an ethylene-propylene-diene rubber (EPDM). It is of particular advantage if the holder 15 is produced by means of a two-component injection-molding process. It is also conceivable for the fastening element 50 to be produced in a first injection-molding process and to serve in a second injection-molding process as an insert at which the fastening element 50 is insert-molded with the further material of the damping element 45. As a result, the holder 15 can be produced in a particularly cost-effective and simple manner. In particular, a time-intensive use of a primer on the fastening element 50 for the integrally bonded connection of the fastening element 50 to the damping element 45 can be omitted here.

In the embodiment, the material of the fastening element 50 has a lower elasticity than the further material of the damping element 45. This ensures that vibrations between the unit 25 and the fastening portion 20 are effectively damped by the damping element 45 and are not transmitted between the fastening portion 20 and the unit 25 via the holder 15. It is thereby ensured that the unit 25 is mounted in a low-vibrating manner and also vibrations generated by the unit 25 are not transmitted to the fastening portion 20.

By means of the broken edge 173 on the fastening element 50, it is furthermore ensured that the fastening element 50 does not locally overstress the material of the damping element 45 and, as a result, the further material of the damping element 45 tears.

It is ensured by means of the recess 175, 180 that the expansion of the fastening element 50, which expansion is introduced into the holder 15 when the unit 25 is installed on the holder, does not act locally, but rather the expansion is distributed over the entire limb 115, 125. This increases the load-bearing capacity of the fastening element 50 and ensures error-free operation of the holder 15. Furthermore, the recess 175, 180 provides a form-fitting connection to the damping element 45 and therefore reduces a shearing stress at common surfaces between limb 115, 125 and damping element 45.

Figure 7:
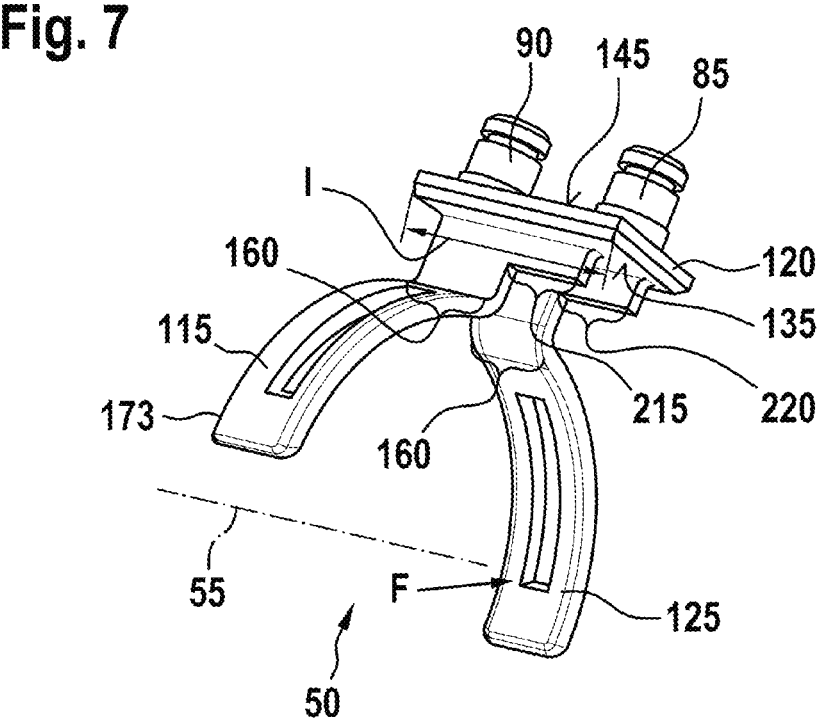
FIG. 7 shows a perspective view of a development of the fastening element shown in FIGS. 4 and 5.

FIG. 7 shows a perspective view of a development of the fastening element 50 shown in FIGS. 4 and 5. The fastening element 50 comprises, by way of example, a first stiffening rib 215 and, for example, a second stiffening rib 220. The stiffening rib 215, 220 is arranged on the first side surface 135 of the connecting portion 120. The stiffening rib 215, 220 extends in the longitudinal direction (x axis) parallel to the longitudinal axis 55, by way of example. In the embodiment, the first stiffening rib 215 is connected to the second portion 160 of the first limb 115. Furthermore, the second stiffening rib 220 is connected in the longitudinal direction to the second portion 160 of the second limb 125. It is particularly of advantage here if the stiffening rib 215, 220 extends over at least 80% of a maximum longitudinal extent l of the connecting portion 120. This configuration has the advantage that a moment of resistance of the connecting portion 120 is increased and therefore the connecting portion 120 remains free from distortion and flat even in the event of a mechanical loading. As a result, bending of the connecting portion 120 out of the plane, for example because of thermal stresses during the injection molding of the fastening element 50, is avoided. It is therefore ensured that the first fastening bolt 85 is oriented parallel to the second fastening bolt 90 in the z direction. It can thereby be reliably ensured that the fastening bolt 85, 90 can be guided through the through opening 35, 40 during the installation of the holder 15 on the fastening portion 20. Furthermore, it is avoided that the fastening bolt 85, 90 is loaded on one side in the operating state and the fastening element 50 mechanically fails prematurely.

Figure 8:
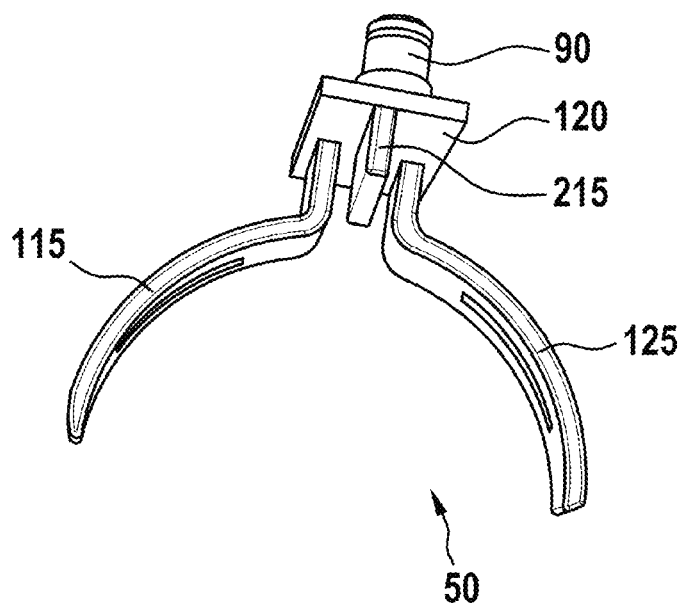
FIG. 8 shows a perspective view of a further development of the fastening element shown in FIG. 7.

FIG. 8 shows a perspective view of a development of the fastening element 50 explained in FIG. 7. In the embodiment, only one stiffening rib 215 is provided. The stiffening rib 215 is arranged in the transverse direction between the first limb 115 and the second limb 125 and substantially extends over the entire longitudinal extent of the connecting portion 120.

It is pointed out that the features shown in FIGS. 1 to 8 may be combined with one another and/or individual features may be omitted.

What is claimed is:

1. A holder (15) for fastening a unit (25) to a motor vehicle (20), the holder comprising
a damping element (45) and a fastening element (50) connected to the damping element (45),
wherein the damping element (45) is connectable to the unit (25),
wherein the fastening element (50) comprises at least one limb (115, 125) and a connecting portion (120) connected to the limb (115, 125),
wherein the limb (115, 125) is disposed within a receptacle (60, 185) of the damping element (45) and is configured to stiffen the damping element (45) at least in sections,
wherein the connecting portion (120) is connectable to the motor vehicle (20), and
wherein a thickness ($s_1, s_2, s_3, s_4$) of the limb (115, 125) decreases with increasing distance ($a_1, a_2$) from the connecting portion (120).

2. The holder (15) according to claim 1,
wherein the thickness ($s_1, s_2, s_3, s_4$) of the limb (115, 125) is selected at least in sections in such a manner that, when a force ($F_1, F_2$) is introduced into the limb (115, 125), a bending stress ($S_1, S_2$) is constant over at least a portion (155, 171) of the limb (115, 125).

3. The holder (15) according to claim 1,
wherein the fastening element (50) has a further limb (125),
wherein the further limb (125) is connected to the connecting portion (120),
wherein the connecting portion (120) is arranged between the limb (115) and the further limb (125), and wherein a thickness (s$_3$, s$_4$) of the further limb (125) decreases with increasing distance of the further limb (125) from the connecting portion (120).

4. The holder (15) according to claim 3, wherein the connecting portion (120), the limb (115) and the further limb (125) are formed integrally and of a same material, wherein the fastening element (50) has at least plastic as the material.

5. The holder (15) according to claim 3, wherein the connecting portion (120), the limb (115) and the further limb (125) are formed integrally and of a same material, wherein the fastening element (50) has at least a polyamide as the material.

6. The holder (15) according to claim 3, wherein the damping element (45) has a material, and wherein the material has an elastomer.

7. The holder (15) according to claim 6, wherein a material of the fastening element (50) has a lower elasticity than the material of the damping element (45).

8. The holder (15) according to claim 3, wherein the holder (15) is produced by means of a two-component injection-molding process.

9. The holder (15) according to claim 1, wherein the damping element (45) extends annularly about a longitudinal axis (55), wherein the limb (115, 125) has a first portion (155, 171), and wherein the first portion (155, 171) runs on a circular path about the longitudinal axis (55).

10. The holder (15) according to claim 9, wherein the limb (115, 125) comprises a second portion (160, 172), wherein the second portion (160, 172) is of substantially flat design, and wherein the second portion (160, 172) is connected to the first portion (155, 171) and to the connecting portion (120) and is arranged between the first portion (155, 171) and the connecting portion (120).

11. The holder (15) according to claim 1, wherein the limb (115, 125) has a recess (175, 180), and wherein the recess (175, 180) has an increasing cross section in a direction of a free end (165, 170) of the limb (115, 125).

12. The holder (15) according to claim 1, wherein the receptacle (60, 185) includes a receiving portion (190, 195, 200), wherein the receiving portion (190, 195, 200) is designed in a manner corresponding to the limb (115, 125), and wherein the receiving portion (190, 195, 200) completely engages around the limb (115, 125).

13. The holder (15) according to claim 1, wherein the connecting portion (120) is of flat design, wherein the limb (115, 125) is connected on a first side surface (135) to the connecting portion (120), wherein the fastening element (50) comprises a stiffening rib (215, 220) on the first side surface (135), and wherein the stiffening rib (215, 220) is connected to the connecting portion (120).

14. The holder (15) according to claim 13, wherein the stiffening rib (215, 220) is connected to a second portion (160, 172) of the limb (115, 125).

15. The holder (15) according to claim 13, wherein the stiffening rib (215, 220) is arranged in a transverse direction between the limb (115) and a further limb (125).

16. The holder (15) according to claim 1, wherein the fastening element (50) comprises at least one fastening bolt (85, 90), wherein the fastening bolt (85, 90) is connected to the connecting portion (120), wherein the damping element (45) has a first contact surface (70) and a second contact surface (75) arranged at a distance from the first contact surface (70), and wherein the fastening bolt (85, 90) is arranged between the first contact surface (70) and the second contact surface (75).

17. The holder (15) according to claim 16, the holder having an engagement element (95, 100), wherein the fastening bolt (85, 90) has a groove (105, 110) and is configured to reach through a fastening portion (20) of the motor vehicle, wherein the engagement element (95, 100) is arranged on a side of the fastening portion (20) that faces away from the damping element (45), and engages in the groove (105, 110) in order to secure the fastening bolt (85, 90) on the fastening portion (20), and wherein a distance between the groove (105, 110) and the contact surface (70, 75) is smaller than a thickness (d) of the fastening portion (20).

18. The holder (15) according to claim 1, wherein the fastening element (50) has at least one broken edge.

19. The holder (15) according to claim 1, wherein the limb (115, 125) has a recess (175, 180), wherein the recess (175, 180) is of trapezoidal design, and wherein the recess (175, 180) has an increasing cross section in a direction of a free end (165, 170) of the limb (115, 125).

20. The holder (15) according to claim 1, wherein the connecting portion (120) is of flat design, wherein the limb (115, 125) is connected on a first side surface (135) to the connecting portion (120), wherein the fastening element (50) comprises a stiffening rib (215, 220) on the first side surface (135), and wherein the stiffening rib (215, 220) is connected to the connecting portion (120) and extends over at least 80 per cent of a maximum longitudinal extent of the connecting portion (120).

21. The holder (15) according to claim 1, wherein the fastening element (50) has at least one broken edge, and wherein the broken edge is rounded or beveled.

22. A holder (15) for fastening a unit (25) to a motor vehicle (20), the holder comprising
a damping element (45) and a fastening element (50) connected to the damping element (45),
wherein the damping element (45) is connectable to the unit (25),
wherein the fastening element (50) comprises at least one limb (115, 125) and a connecting portion (120) connected to the limb (115, 125),
wherein the limb (115, 125) is configured to stiffen the damping element (45) at least in sections,
wherein the connecting portion (120) is connectable to the motor vehicle (20), and
wherein a thickness (s$_1$, s$_2$, s$_3$, s$_4$) of the limb (115, 125) decreases with increasing distance (a$_1$, a$_2$) from the connecting portion (120)
wherein the damping element (45) extends annularly about a longitudinal axis (55),
wherein the limb (115, 125) has a first portion (155, 171), and wherein the first portion (155, 171) runs on a circular path about the longitudinal axis (55).

23. A holder (15) for fastening a unit (25) to a motor vehicle (20), the holder comprising
a damping element (45) and a fastening element (50) connected to the damping element (45),
wherein the damping element (45) is connectable to the unit (25),
wherein the fastening element (50) comprises at least one limb (115, 125) and a connecting portion (120) connected to the limb (115, 125),
wherein the limb (115, 125) is configured to stiffen the damping element (45) at least in sections,
wherein the connecting portion (120) is connectable to the motor vehicle (20), and
wherein a thickness ($s_1, s_2, s_3, s_4$) of the limb (115, 125) decreases with increasing distance ($a_1, a_2$) from the connecting portion (120)
wherein the limb (115, 125) has a recess (175, 180), and
wherein the recess (175, 180) has an increasing cross section in a direction of a free end (165, 170) of the limb (115, 125).

24. A holder (15) for fastening a unit (25) to a motor vehicle (20), the holder comprising
a damping element (45) and a fastening element (50) connected to the damping element (45),
wherein the damping element (45) is connectable to the unit (25),
wherein the fastening element (50) comprises at least one limb (115, 125) and a connecting portion (120) connected to the limb (115, 125),
wherein the limb (115, 125) is configured to stiffen the damping element (45) at least in sections,
wherein the connecting portion (120) is connectable to the motor vehicle (20), and
wherein a thickness ($s_1, s_2, s_3, s_4$) of the limb (115, 125) decreases with increasing distance ($a_1, a_2$) from the connecting portion (120)
wherein the damping element (45) comprises a receptacle (60, 185) with a receiving portion (190, 195, 200),
wherein the receiving portion (190, 195, 200) is designed in a manner corresponding to the limb (115, 125), and
wherein the receiving portion (190, 195, 200) completely engages around the limb (115, 125).

25. A holder (15) for fastening a unit (25) to a motor vehicle (20), the holder comprising
a damping element (45) and a fastening element (50) connected to the damping element (45),
wherein the damping element (45) is connectable to the unit (25),
wherein the fastening element (50) comprises at least one limb (115, 125) and a connecting portion (120) connected to the limb (115, 125),
wherein the limb (115, 125) is configured to stiffen the damping element (45) at least in sections,
wherein the connecting portion (120) is connectable to the motor vehicle (20), and
wherein a thickness ($s_1, s_2, s_3, s_4$) of the limb (115, 125) decreases with increasing distance ($a_1, a_2$) from the connecting portion (120)
wherein the connecting portion (120) is of flat design,
wherein the limb (115, 125) is connected on a first side surface (135) to the connecting portion (120),
wherein the fastening element (50) comprises a stiffening rib (215, 220) on the first side surface (135), and
wherein the stiffening rib (215, 220) is connected to the connecting portion (120).

26. The holder (15) according to claim 25, wherein the stiffening rib (215, 220) extends over at least 80 per cent of a maximum longitudinal extent of the connecting portion (120).

27. A holder (15) for fastening a unit (25) to a motor vehicle (20), the holder comprising
a damping element (45) and a fastening element (50) connected to the damping element (45),
wherein the damping element (45) is connectable to the unit (25),
wherein the fastening element (50) comprises at least one limb (115, 125) and a connecting portion (120) connected to the limb (115, 125),
wherein the limb (115, 125) is configured to stiffen the damping element (45) at least in sections,
wherein the connecting portion (120) is connectable to the motor vehicle (20), and
wherein a thickness ($s_1, s_2, s_3, s_4$) of the limb (115, 125) decreases with increasing distance ($a_1, a_2$) from the connecting portion (120)
wherein the fastening element (50) comprises at least one fastening bolt (85, 90),
wherein the fastening bolt (85, 90) is connected to the connecting portion (120),
wherein the damping element (45) has a first contact surface (70) and a second contact surface (75) arranged at a distance from the first contact surface (70), and
wherein the fastening bolt (85, 90) is arranged between the first contact surface (70) and the second contact surface (75).

28. A holder (15) for fastening a unit (25) to a motor vehicle (20), the holder comprising
a damping element (45) and a fastening element (50) connected to the damping element (45),
wherein the damping element (45) is connectable to the unit (25),
wherein the fastening element (50) comprises at least one limb (115, 125) and a connecting portion (120) connected to the limb (115, 125),
wherein the limb (115, 125) is configured to stiffen the damping element (45) at least in sections,
wherein the connecting portion (120) is connectable to the motor vehicle (20), and
wherein a thickness ($s_1, s_2, s_3, s_4$) of the limb (115, 125) decreases with increasing distance ($a_1, a_2$) from the connecting portion (120)
wherein the limb (115, 125) has a recess (175, 180),
wherein the recess (175, 180) is of trapezoidal design, and
wherein the recess (175, 180) has an increasing cross section in a direction of a free end (165, 170) of the limb (115, 125).

* * * * *